May 24, 1949.　　　C. N. BENANDER ET AL　　　2,471,139
CONTINUOUS ROTOR MOLDING MACHINE
Filed March 25, 1947　　　　　　　　　　　　　4 Sheets-Sheet 1
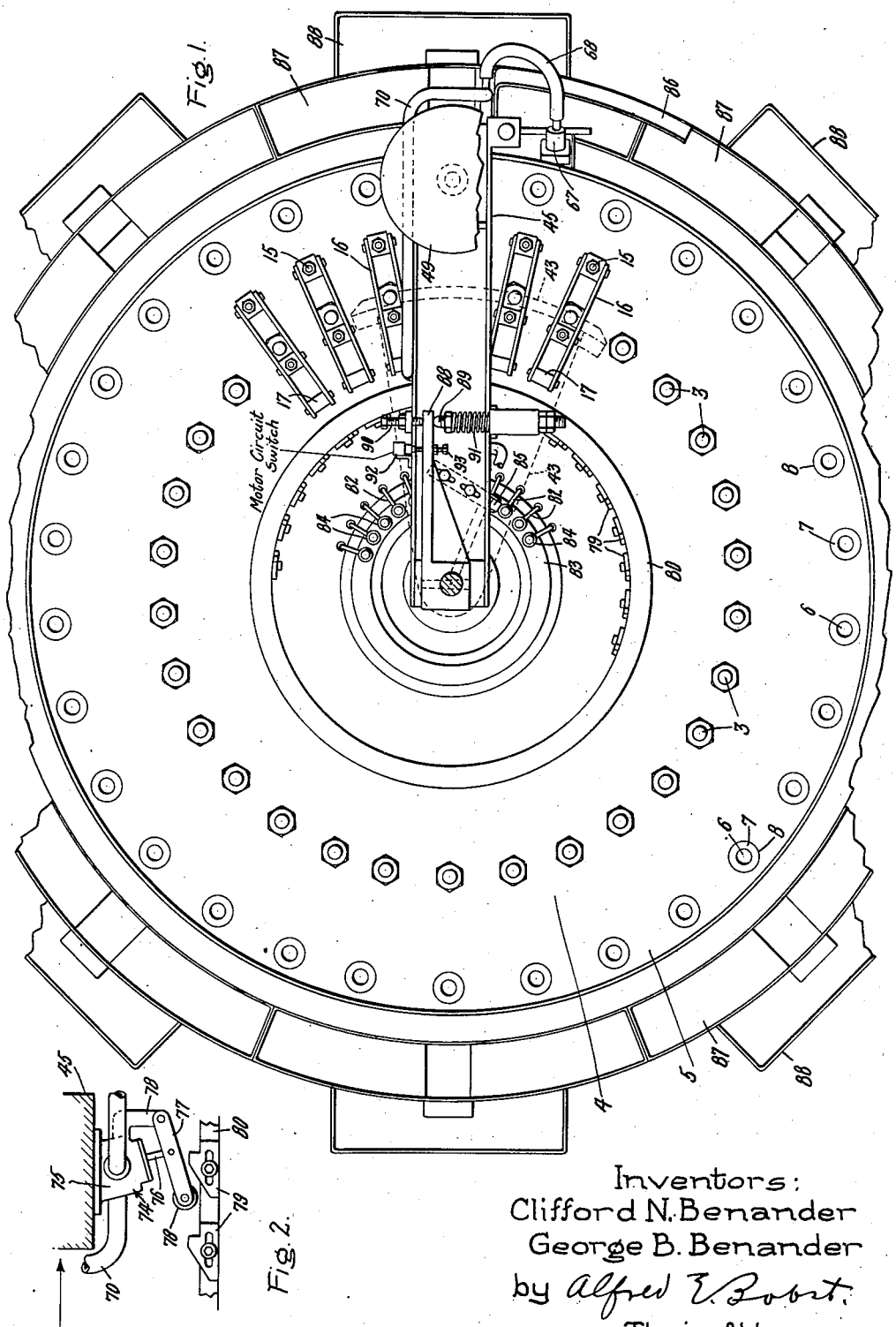
Inventors:
Clifford N. Benander
George B. Benander
by Alfred E. Robert
Their Attorney.

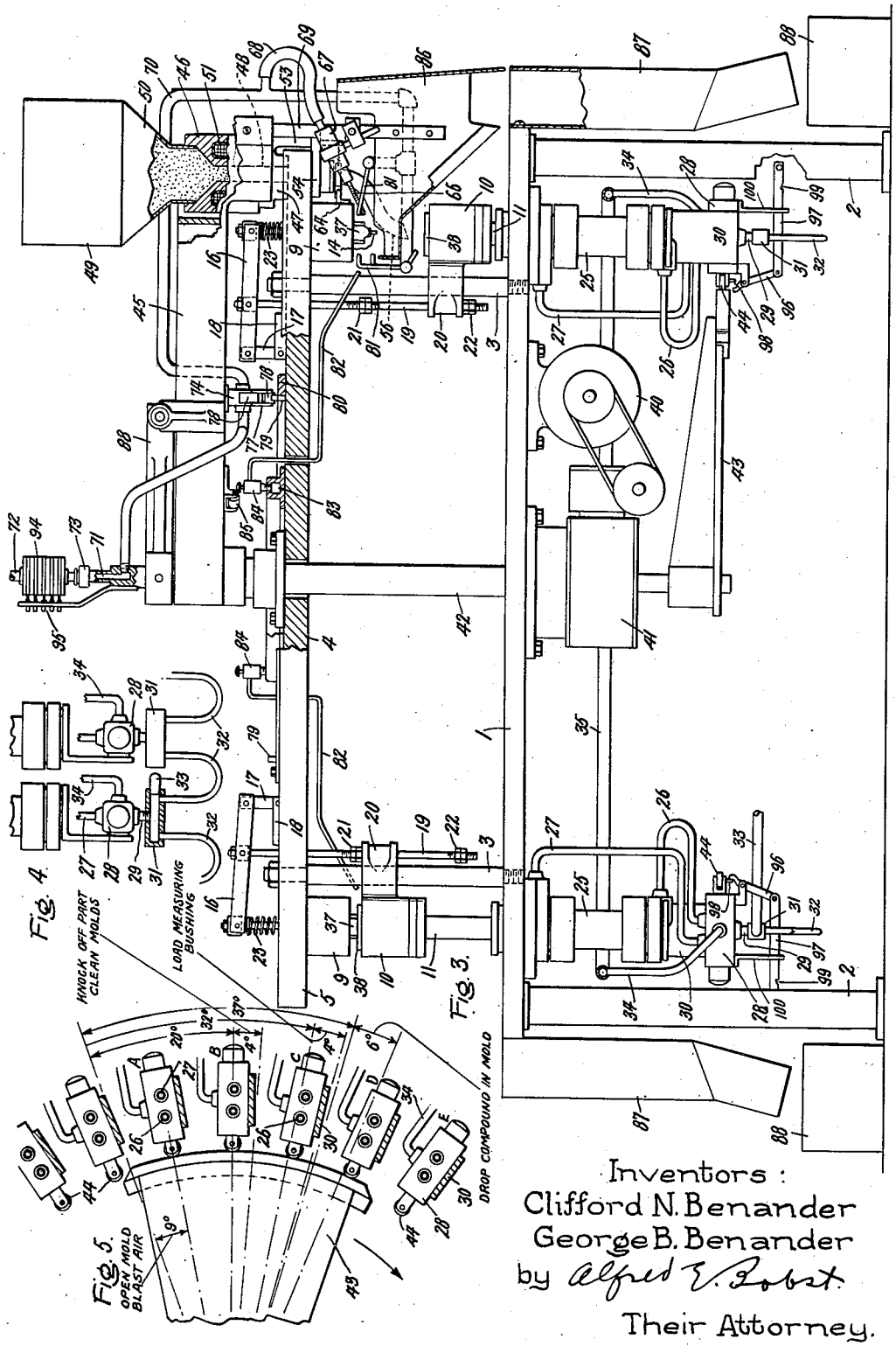

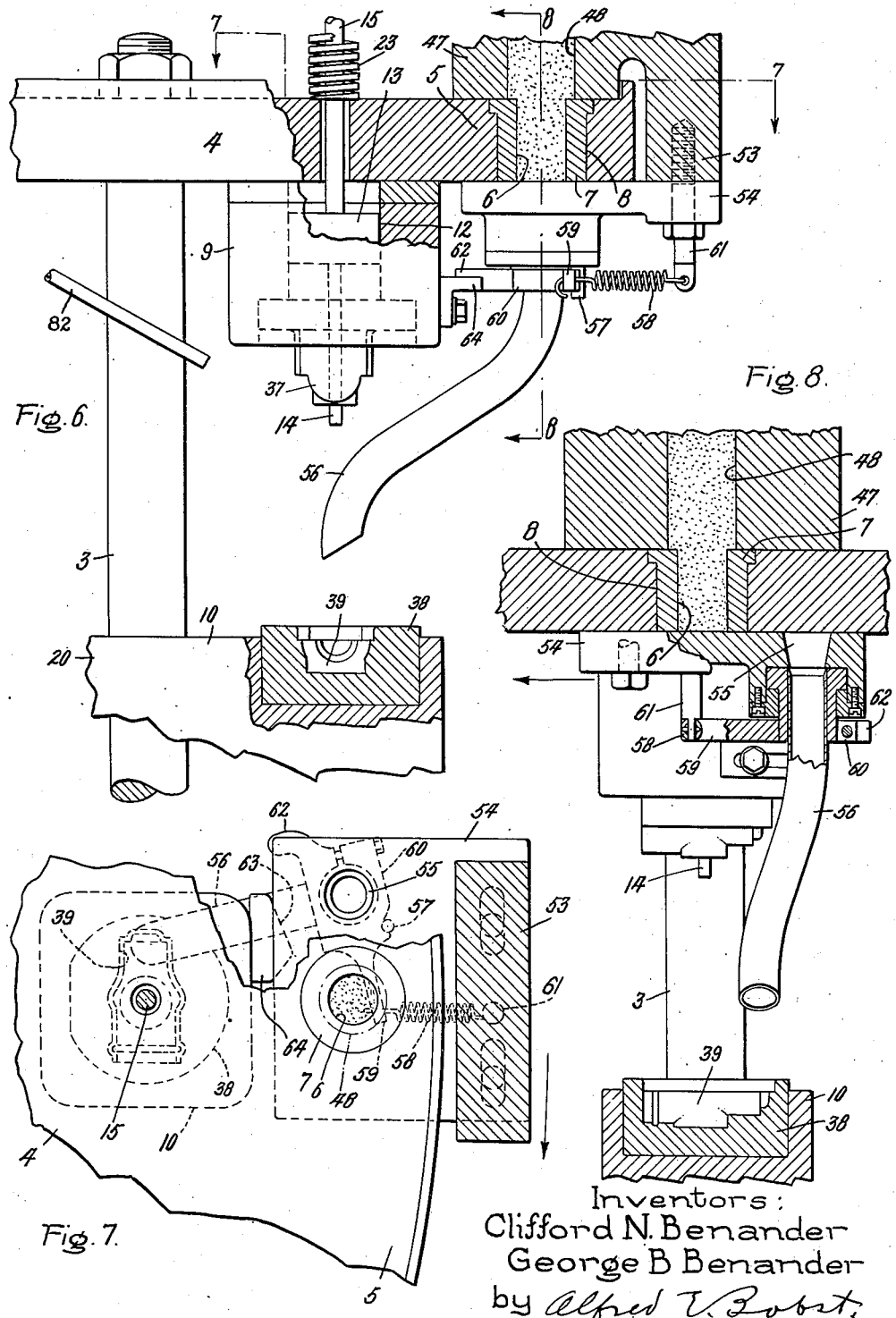

May 24, 1949.  C. N. BENANDER ET AL  2,471,139
CONTINUOUS ROTOR MOLDING MACHINE
Filed March 25, 1947  4 Sheets-Sheet 4

Inventors:
Clifford N. Benander
George B. Benander
by Alfred E. Bobst
Their Attorney.

Patented May 24, 1949

2,471,139

UNITED STATES PATENT OFFICE 2,471,139

CONTINUOUS ROTOR MOLDING MACHINE

Clifford N. Benander, Meriden, Conn., and George B. Benander, Oaklawn, R. I., assignors to Monowatt Incorporated, a corporation of Connecticut Application March 25, 1947, Serial No. 737,176

16 Claims. (Cl. 18—5)

The present invention relates to machines for molding loose powdered or granular resins or other types of thermosetting materials capable of being molded and cured in a suitable mold by the combined action of heat and pressure or by either alone. It is especially well adapted for the molding of relatively small objects, for example, parts of wiring devices, such as switches, plug receptacles, lamp sockets, and the like, although it is not limited thereto.

One object of the invention is to provide an improved molding machine which is simple in structure, reliable in operation, and requires a minimum of attention by the operator.

Another object is to provide a machine having a plurality of molding stations which can be set up quickly and easily for molding a desired item or part at each station, the arrangement being such that the same item or part may be molded at all the stations or a different item or part may be molded at each station.

Another object is to provide an improved construction wherein any station may be quickly and easily changed from making one molded item or part to making another molded item or part without shutting down the machine or interrupting the molding at the other stations.

Other objects of the invention and the advantages of the invention will appear more fully from the following specification.

For a consideration of what we believe to be novel and our invention, attention is directed to the following specification and to the claims appended thereto.

Figure 9:
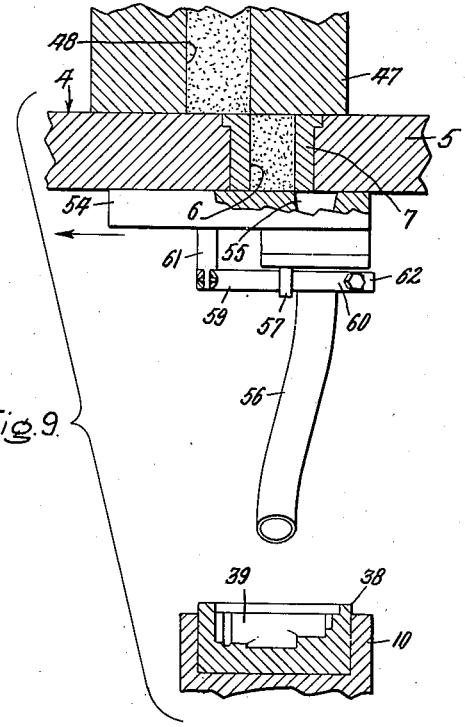
Figure 11:
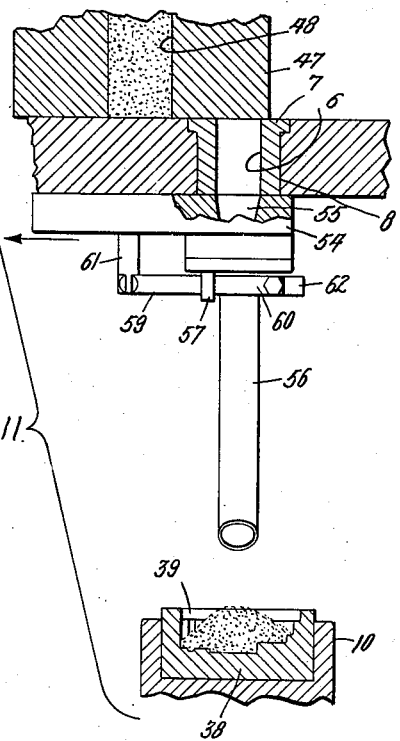
Figure 10:
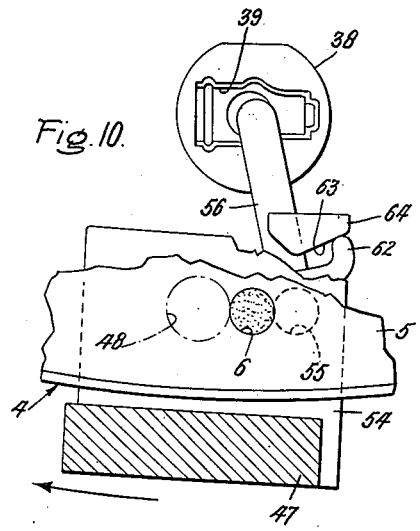
Figure 12:
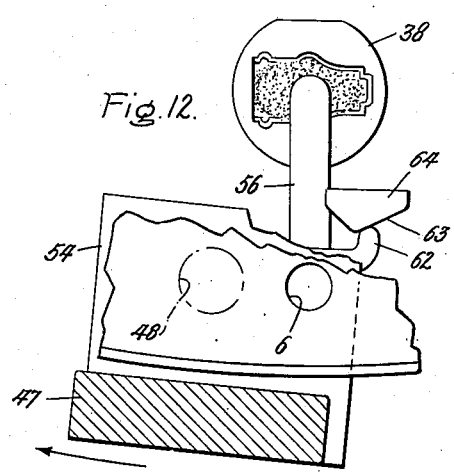

In the drawing, Fig. 1 is a top plan view of a molding machine embodying our invention; Fig. 2 is a fragmentary detail view showing a cam operated valve arrangement; Fig. 3 is a side elevation, partly in section, of the machine but showing only two diametrically opposite molding stations; Fig. 4 is a detail view illustrating a manifold arrangement; Fig. 5 is a detail plan view illustrating the cam construction for operating the valves of the hydraulic motors for the molds; Fig. 6 is a detail view on a larger scale, partly in section, showing a part of one of the molding stations; Fig. 7 is a sectional plan view taken on line 7—7 of Fig. 6 looking in the direction of the arrows; Fig. 8 is a detail sectional view taken on line 8—8 of Fig. 6 looking in the direction of the arrows; Fig. 9 is a detail explanatory view showing certain of the parts in one position; Fig. 10 is a plan view of the structure shown in Fig. 9; Fig. 11 is a view similar to Fig. 9 showing the same parts in another position; and Fig. 12 is a top plan view of the parts shown in Fig. 11.

Referring to the drawings, 1 indicates a bed plate or table which is preferably circular. It may be made from suitable metal, such as boiler plate. It is supported on circumferentially spaced legs 2. Attached to the bed plate at their lower ends are a series of circumferentially spaced guide and supporting posts 3, on the upper ends of which is supported a top plate 4 of a diameter substantially the same as that of bed plate 1. The peripheral portion of the top plate forms what may be termed a molding material or powder-loading ring. In the present instance, the powder-loading ring is shown as being an integral part of the top plate, but it may be a separate ring suitably attached to the peripheral edge of the top plate. Bedplate 1, supporting legs 2, posts 3, top plate 4, and molding powder-loading ring 5 form an integral stationary structure. Carried by the stationary structure are a plurality of circumferentially spaced molding stations, there being 30 stations in the present instance. The stations are alike. Each comprises a molding powder measuring means and a hydraulically operated molding structure.

One molding station will be described. It will be understood that the others are duplicates.

Each molding powder measuring means comprises a pocket or opening 6 which extends through the powder-loading ring. The pocket or opening 6 preferably is defined by a bushing 7 positioned in a hole 8 in the ring. Bushing 7 fits hole 8 closely so as to be frictionally held in the ring. By this arrangement, the capacity of the pocket may be changed by removing one bushing and substituting another having a different sized pocket or opening 6. The pocket or opening 6 is used to measure the molding material required by the particular item or article being molded at the particular station as hereinafter more fully explained.

Each molding structure comprises a top mold holder 9 suitably attached to and carried by the underside of top plate 4 and a lower mold holder 10 suitably attached to and carried by the upper end of a plunger rod 11. The upper mold member has a guide opening 12 in which is positioned a knockout pin block 13 (Fig. 6). Carried by and depending from the lower side of block 13 are a suitable number of spaced knockout pins 14. Connected to the upper side of block 13 is a rod 15 the upper end of which is pivoted on one end of a lever 16. The other end of lever 16 is pivoted on the upper end of an arm 17, the lower end of which is pivotally connected to a bracket 18 fixed to the upper surface of top plate 4. Lever 16 is suitably constructed as shown in plan in Fig.

1. Connected to lever 16 between its ends is an actuating rod 19 which extends down through top plate 4, terminating short of bed plate 1. On the lower mold member 10 is an arm 20 having an opening through which rod 19 projects. On rod 19 on opposite sides of arm 20 are upper and lower stop nuts 21 and 22. Arm 20 engages stop nuts 21 and 22, respectively, at the two ends of its travel to actuate knockout pins 14. Lever 16 is biased toward its topmost position by a spring 23 which surrounds rod 15 and is located between the underside of lever 16 and the top surface of top plate 4. Guide post 3 passes through an opening in arm 20 and serves as a guide for mold holder 10.

Rod 11 at its lower end is connected to the piston of an hydraulic motor, the cylinder of which is indicated at 25. Actuating fluid, for example, oil, is supplied to the cylinder at its ends on opposite sides of the piston by pipes 26 and 27 which connect with a valve 28, to which fluid is supplied by a supply pipe 29. Valve 28 is supported by an angle plate 30 attached to the bottom of cylinder 25. Pipe 29 is connected to a fluid supply manifold comprising a plurality of spaced chambers 31 connected together by U-shaped jumper pipes 32 to form a cylindrical manifold. Fluid is supplied to one of the chambers 31 from a suitable source of fluid pressure supply by a supply pipe 33. From this one chamber, fluid flows through the jumper pipes to all the other chambers. Connected with the casing of valve 28 is a fluid discharge pipe 34 which connects with an annular fluid discharge manifold 35 which, in turn, is connected with a suitable fluid supply storage tank (not shown).

Valve 28 is biased by a spring or other means toward the right as viewed at the left-hand side of Fig. 3 to what may be termed its outer position. In this position, supply pipe 29 is connected to pipe 26 to supply fluid pressure beneath the piston in cylinder 25, pipe 27 being connected through the valve to discharge pipe 34. This holds the piston in cylinder 25 at the top of its stroke where the mold is closed. This may be considered the normal position of the valve and mold structure. When the stem of the valve is moved toward the left from the position in which it is shown at the left-hand side of Fig. 3, to what may be termed its inner position, supply pipe 29 is then connected to pipe 27 to supply fluid pressure to the top of cylinder 25 to move the piston downward. At this time, pipe 26 is connected to discharge pipe 34. When the piston moves downward, the lower mold holder 10 is moved down away from the upper mold holder 9 to open position, and it will remain in open position as long as valve 28 is held in its inner position. This is the position of the parts as shown at the right-hand side of Fig. 3 where the mold is shown open. In connection with Fig. 3, only two of the molding stations are shown, the others being omitted for the sake of clearness. Also in Fig. 1 the lever 15 and other parts for only a few molding stations are shown. It will be understood that each opening 8 in the powder loading ring 5 represents a molding station and that the molding mechanism is duplicated at each molding station.

Molds suitable for molding a desired item may be fastened in the upper and lower mold holders. In the present instance (see Figs. 3 and 6), a mold 37 is fastened in the upper mold holder and a mold 38 is fastened in the lower mold holder. Mold 38 has a cavity 39 in which the molding powder is placed. The molds 37 and 38 are easily removed from and replaced in the holders.

The mold structure including the hydraulic motor for operating it, the knockout pin arrangement and the valve for controlling the supply of fluid pressure to the hydraulic motor is a known one and is to be taken as typical of any valve controlled hydraulic motor operated mechanism. The specific construction of these parts form no part of our present invention.

By our invention, we provide means for continuously and automatically opening the molds one after another, ejecting a molded item from the mold and directing it to a receptacle, measuring out a correct amount of molding powder, transferring the measured-out amount to the cavity of the mold, and again closing the mold. The mechanism for performing these operations will be now described.

Mounted on the underside of bed plate 1 is an electric motor 40 which through a belt and reduction gearing in a casing 41 turns a vertical shaft 42 which extends both above and below gear casing 41 at the center of plates 1 and 4. The upper end of shaft 42 extends through an opening in top plate 4 and is provided with a suitable bearing, as indicated in Fig. 3, the bearing being attached to the top of plate 4. On the lower end of shaft 42 is a cam 43 for actuating valves 28, it being arranged to engage rollers 44 on the ends of the stems of the valves (see Fig. 5) one after another to successively actuate them. As shown in Fig. 5, the cam is of a length to engage four valve stems at a time. As it rotates in the direction of the arrow shown in Fig. 5, it successively moves into engagement with the valve stem in advance of it and moves from engagement with the valve stem at its trailing end. Thus, it will be seen that four molds are open at a time.

On the upper end of shaft 42 above top plate 4 is an arm 45 which turns with the shaft. It is in vertical alignment with cam 43. Arm 45 comprises a pair of spaced side plates suitably connected together as shown in plan in Fig. 1. Fastened between the outer ends of the side plates which form arm 45 is a hopper slide block 46 provided with a downwardly projecting nose 47 having a flat bottom surface which slides along on the top surface of powder-loading ring 5 in line with measuring pockets or openings 6. Extending axially through block 46 and nose 47 is an opening 48 which, as arm 45 turns, is brought successively into line with the pockets or openings 6. Carried by block 46 is a hopper 49 having at its lower end a funnel shaped discharge nozzle 50 which terminates in a sleeve which fits into the enlarged upper end of opening 48 (see Fig. 3). Embedded in block 46 is an electric heating coil 51 which may be utilized for preheating the molding material. Block 46 may be suitably mounted between the ends of the side arms of lever 45 in a manner such that it may be adjusted for lining up opening 48 with pockets or openings 6.

On nose 47 is an extension 53 (see Fig. 6) which overlaps the periphery of powder-loading ring 5 terminating flush with the lower surface of ring 5. Bolted to the bottom surface of extension 53 is a plate 54 which extends over and is in sliding engagement with the under surface of ring 5. Plate 54 forms in substance a part of block 46. In plate 54 is an opening 55. Positioned in line with opening 55 is a swinging discharge spout 56. It is pivotally connected to plate 54, as shown clearly in Fig. 8 and is normally held against a stop pin 57 (see Fig. 7) by a tension spring 58, one end of which is attached to a finger 59 projecting from a collar 60 fixed around the upper end of the spout and at the other end to the lower end of a stud 61 on plate 54. Spout 56 is shaped as best shown in Fig. 6 so that its lower end is in alignment with the circle of the cavities 39 in molds 38. On collar 60 is a projecting nose 62 adapted to engage a cam surface 63 on a cam 64 mounted adjustably on the side of each upper mold holder 9. As nose 62 rides along cam surface 63, spout 56 is turned on its pivot by an amount sufficient such that as arm 45 continues to rotate past a molding station, spout 54 will be turned sufficiently to keep its lower end in line with the cavity 39 of the lower mold. Thus, as arm 45 moves past a molding station, the lower end of spout 54 is in substance held stationary with respect to the cavity 39 at such station. As soon as nose 62 moves beyond cam surface 63, spring 58 returns the spout to its former position wherein collar 60 on the spout engages stop pin 57.

The operation of the mechanism so far described is as follows:

Assume that hopper 49 is filled with molding powder or compound and that motor 40 is turning shaft 42 in a clockwise direction as viewed in Fig. 1, this being the direction indicated by the arrow in Fig. 5. As shown in Fig. 5, the four molding stations indicated at A, B, C, and D have their valves actuated by cam 43 so that the molds at these four stations are all open. The molds at all the other stations are closed. Cam 43 will operate next the valve 28 at the station indicated at E in Fig. 5. Arm 45 and the parts carried by it are turning along with shaft 42 and cam 43. When cam 43 operates the valve 28 at station E, the piston in cylinder 25 at station E will be operated to open the mold and the mold will be held open until cam 43 moves from engagement with the valve 28 at station E. If a unit has been molded at station E, it will be ejected when the mold opens. After a predetermined further turning of arm 45, opening 48 in block 46 starts to move across the pocket or opening 6 in loading ring 5 located at station E and in moving across such pocket, it fills it with molding compound. During this period, the bottom of such pocket is covered by plate 54. Opening 55 in plate 54 is spaced behind opening 48 as regards the direction of rotation so that it has not yet reached pocket 6 at station E. One position of the parts at this time is shown in Fig. 8 where it will be seen that opening 48 is in line with pocket 6, the pocket is filled with molding powder, and opening 55 is yet some distance behind pocket 6 as regards the direction of rotation of arm 45. As arm 45 continues to turn, carrying with it block 46, plate 54 and spout 56, opening 48 will move out of line with the top of pocket 6, after which opening 55 will be brought into line with the bottom of pocket 6. Preferably, opening 55 is spaced behind opening 48 by an amount such that it starts to move into line with the bottom of pocket 6 just as opening 48 is moving completely out of line with the top of pocket 6. This is shown by the positions of the parts in Figs. 9 and 10. In the Fig. 9 positions of the parts, the discharge end of spout 56 is directly over mold cavity 39, and nose 62 is just starting to ride along cam surface 63 (Fig. 10). As the shaft 42 continues to rotate, opening 55 moves across the bottom of pocket 6, as illustrated in Fig. 11, and the measured amount of molding powder in pocket 6 flows down through the spout into the molding cavity 39, as shown in Figs. 11 and 12. During this period, while nose 62 is riding along cam surface 63, the spout is turning on its pivot against the action of spring 58 by an amount such that in substance the discharge end of the spout is stationary with respect to the mold cavity, so that the molding powder will flow directly into the cavity. When nose 62 moves beyond cam surface 63, spring 58 will return the spout to its normal position against stop pin 57. By adjusting cam 64, the turning of spout 56 can be correctly timed. Cam 43 now moves from engagement with the stem of valve 28 at station E, permitting the valve to return to its normal position to effect closing of the mold at station E in the manner already described. If in closing, spring 23 does not lift the ejector pins 14 then arm 20 will engage stop nut 21 to lift lever 16 and thus raise the ejector pins. The mold at station E will now remain closed until the leading end of cam 43 again reaches the valve 28 at station E to again effect the opening of the mold. When the mold opens, arm 20 toward the end of the opening movement engages lower stop nut 22 to pull down lever 16 to operate the ejector pins to disengage the molded item from the upper mold 37. The molded item may be, for example, one half of a wiring device casing, as indicated by dotted line outline of the mold cavity 39 in Fig. 7. The mold at station E is then again filled and closed to repeat the molding operation.

Referring to Fig. 5, it will be seen that cam 43 effects operations at four stations at a time. At station D, the mold is being opened; at station C, the mold is open and the molded item is being ejected from the mold and the molds blasted clean by compressed air; at station B, the mold is being filled, and at station A, the mold has just been filled and is ready to be closed as soon as cam 43 moves from engagement with valve 28 at station A. It will be understood that each of these operations are timed to take place during a predetermined angular movement of cam 43. The extent of these angular movements are indicated approximately on cam 43 by the dotted lines in Fig. 5. Also it will be understood that cam 43 and arm 45 are adjusted with respect to each other to effect the desired timing of the opening, filling and closing of a mold.

The rate of rotation of shaft 42 is such that the period of time during which a mold is closed is sufficient for the curing of the molding compound.

To assist in removing a molded unit from the upper mold, there is provided an air-operated plunger 66 which may be in the form of a relatively flexible coil spring connected to a piston in a cylinder 67 to which compressed air is supplied by a hose 68. The piston and cylinder are carried by a bracket 69 attached to arm 45. Hose 68 is connected to a pipe line 70 carried by arm 45. The pipe line terminates in an axial passage 71 at the upper end of shaft 42. Compressed air is supplied to passage 71 from a suitable source of supply by a stationary supply pipe 72 which is connected to the upper end of shaft 42 by a sleeve coupling 73 of a type such that the upper end of shaft 42 may turn in the coupling. This serves to permit turning movement of shaft 42 with respect to stationary supply pipe 72. In the pipe line 70 is a normally closed valve 74 carried by the underside of arm 45. It is shown in detail in Fig. 2. It comprises a valve casing 75 in which is a suitable valve to which is connected a valve stem 76. Valve stem 76 is connected to a lever arm 77 pivoted on a bracket 78 integral with valve casing 75. At its free end, lever arm 77 is provided with a roller 76. Valve 74 is operated by a series of cams 79, one for each molding station. The cams are carried by a ring 80 attached to the top surface of top plate 4. The cams are adjustable on the ring so as to be correctly positioned with respect to the molding stations. As arm 45 rotates past a molding station, roller 76 rides up a cam 79 to open valve 74 at the correct time to supply a blast of air through pipe 70 and hose 68 to operate the plunger 66. At the end of its forward movement, the plunger 66 engages the molded item to knock it off the upper mold 37 if it has not already been knocked off by the ejector pins. When roller 76 moves beyond a cam 79, the supply of air through the pipe line 70 is shut off.

Connected also with pipe lines 70 are a number of nozzles 81 which direct blasts of air against the upper and lower molds to clean them. The air pressure in pipe line 70 after valve 74 closes is dissipated through these nozzles. The air blasts through nozzles 81 may be continued, if desired, up to a time just prior to the transfer of the molding material from the loading ring to the cavity of the mold thus effecting a thorough cleaning of the two mold parts.

As a further means for ejecting a molded item from an upper mold, there is provided at each molding station, a stationary air pipe 82 which discharges a blast of air toward the upper mold after it has opened. The pipes 82 are each connected to an annular compressed air manifold 83 fastened to the upper surface of top plate 4 and to which compressed air is supplied by a suitable supply pipe (not shown). In each pipe 82 is a normally closed valve 84 adapted to be opened by a roller 85 carried on the underside of arm 45. The arrangement is such that roller 85 opens the valves 84 successively to supply blasts of air through pipes 82 at the correct times with respect to the opening of the molds. Preferably this blast is supplied beginning prior to the time plunger 66 operates so that in case the molded item is ejected from the mold by the ejector pins 14, before plunger 66 is operated, the blast from pipe 82 will blow the molded item into the chute 86.

The molded unit ejected at a molding station falls into a chute 86 carried by bracket 69 and is directed by the chute to a spout 87 carried by base plate 1, through which it falls to a receptacle 88 resting on the floor. It will be understood that there is or may be a spout 87 at each molding station.

In connection with the rotating parts comprising arm 45 and the mechanism carried by it, there is provided means whereby in case resistance beyond a certain amount is offered to the turning of arm 45, a thing which may occur due to faulty operation, the motor circuit will be opened automatically. To this end, arm 45 is mounted loosely on shaft 42 and is made to turn with the shaft by an auxiliary arm 88 which is fixed to shaft 42 and at its outer end engages the end of a spring pressed plunger 89 carried by arm 45. Auxiliary arm 88 is positioned with respect to and is held against the end of plunger 89 by an adjustable stop stud 90. The spring 91 of the plunger is adjusted to put it under the desired amount of initial compression. Carried by arm 45 is an electric switch 92 which is biased to open position and which is normally held closed by an adjustable stud 93 carried by auxiliary arm 88. Switch 92 is in the circuit of motor 40. Normally the parts are in the positions shown in Fig. 1, the switch 92 being held closed by stud 93. In case arm 45 offers undue resistance to turning, auxiliary arm 88 will move relatively to arm 45 against the action of spring 91, and when a predetermined movement occurs, stud 93 will open, thus opening the motor circuit. The circuit will remain open until the obstruction holding arm 45 is removed. The circuit wires for motor switch 92 and the circuit wires for the heating coils may be carried to arm 45 through a stationary commutator 94 carried by pipe 72 with which engages a brush structure 95 carried by shaft 42 to turn with it. The several circuits are not shown in the drawings, it being unnecessary for an understanding of the invention.

Means are provided whereby any molding station may be put out of operation temporarily. To this end, there is provided at each molding station a cut out lever 96 having operating rod 97 pivotally connected to it at its lower end. The upper end of the lever stands in line with a lug 98 on the stem of valve 28. By pushing a rod 97 at any station inward, lever 96 will move the corresponding stem of valve 28 inward to effect opening of the mold. It may be held in open position by engaging a notch 99 in rod 97 with the edge of an opening in a guide bracket 100, through which rod 97 passes. When a station is put out of operation, a solid plug may be placed in the opening 8 in the powder-loading ring at such station, thus blanking out such opening so that nose 47 can pass across it without depositing any molding compound.

Our machine is relatively simple and compact in structure, reliable in operation and comprises a minimum of moving parts. As a result, it requires relatively little attention during operation, it being necessary only to keep the hopper supplied with molding material and to carry away the molded units. The machine may be set up to mold as many different kinds of items as there are molding stations, there being thirty molding stations in the machine illustrated. At the other extreme, it may be set up to mold the same item at all molding stations. Also one or more molding stations may be put out of use temporarily or for any desired period of time without stopping the machine or affecting the operation of the other stations. A molding station may be changed from molding one kind of item to molding another kind without shutting down the machine as a whole. To do this, a molding station may be shut down by means of its cut-out lever 96 after which the molds in the mold holders may be changed and a measuring bushing 7 of correct capacity substituted for the one then in the opening 8. While the molds at a station are being changed or when a station is temporarily put out of use, the opening 8 in the loading ring 5 at that station may be closed with a blank, i. e. a solid plug. After the molds are changed or when it is desired to again use the station, a bushing 7 of correct capacity is substituted for the blank, a thing requiring only a few seconds.

The time needed for a complete revolution of arm 45 depends on the rapidity with which the particular molding material being used is capable of being cured. By way of example, with certain molding materials the time for a complete revolution of arm 45 may be of the order of one or two minutes. Under these conditions the time during which a mold at a station is being opened, reloaded and closed would be of the order of some 7 to 10 seconds.

What we claim as new and desire to secure by Letters Patent of the United States is:

1. In a molding machine, a flat stationary circular member having a series of spaced openings, a hopper for molding material, means defining a discharge nozzle for the hopper having a flat bottom surface in engagement with the top surface of said circular member and arranged to move directly across said openings for filling them with molding material from the hopper, molding means for each opening comprising upper and lower mold members both positioned below said circular member, means positioned below said circular member for transferring molding material from the openings to the molding means, means for effecting opening and closing movements of the molding means, actuating means for said last named means, and means for moving said hopper, transfer means and actuating means as a unit past said openings and molding means.

2. In a molding machine, a flat stationary circular member having a series of spaced openings, a hopper for molding material, means defining a discharge nozzle for the hopper having a flat bottom surface in engagement with the top surface of said circular member and arranged to move directly across said openings for filling them with molding material from the hopper, molding means for each opening comprising upper and lower mold members both positioned below said circular member, a spout positioned below said circular member for transferring molding material from the openings to the molding means, means for effecting opening and closing movements of the molding means, actuating means for said last named means, and means for moving said hopper, spout and actuating means as a unit past said openings and molding means.

3. In a molding machine, a flat stationary circular member having a series of spaced openings, a hopper for molding material, means defining a discharge nozzle for the hopper having a flat bottom surface in engagement with the top surface of said circular member and arranged to move over said openings for filling them with molding material from the hopper, molding means for each opening, a swinging spout for transferring molding material from the openings to the molding means, means for effecting opening and closing movements of the molding means, actuating means for said last named means, means for moving said hopper, spout and actuating means as a unit past said openings and molding means, and means for turning said spout with respect to said moving means to hold the end of the spout stationary at a molding means during continuous rotation of said hopper and during transfer of molding material from an opening to such molding means.

4. In a molding machine, a moulding material loading ring having a ring of circumferentially spaced measuring openings therethrough, a molding structure at each opening comprising upper and lower mold members both positioned below said loading ring, continuously rotating means positioned above said loading ring for supplying successively molding material to said measuring openings, continuously rotating means for effecting successively the opening and closing of said molding structures, and continuously rotating means positioned below said loading ring for transferring successively molding material from said measuring openings to said molding structures.

5. In a molding machine, a plurality of molding stations comprising a molding material loading ring having a ring of circumferentially spaced measuring openings therethrough, one at each station, and a molding structure at each opening, rotating means for supplying successively molding material to said measuring openings, rotating means for effecting successively the opening and closing of said molding structures, rotating means for transferring successively molding material from said measuring openings to said molding structures, and means turning all said rotating means from station to station successively.

6. In a molding machine, a plurality of molding stations comprising a molding material loading ring having a ring of circumferentially spaced measuring openings therethrough, one at each station, and a molding structure at each opening, a hopper for supplying molding material to said measuring openings, a cam for effecting the opening and closing of said molding structures, a spout for transferring molding material from said measuring openings to said molding structures, and means for moving said hopper, cam and spout from station to station successively.

7. In a molding machine, a plurality of molding stations comprising a molding material loading ring having a ring of circumferentially spaced openings therethrough, one at each station, a removable measuring bushing in each opening and a molding structure at each opening, rotating means for supplying successively molding material to said measuring bushings, rotating means for effecting successively the opening and closing of said molding structures, rotating means for transferring successively molding material from said measuring bushings to said molding structures, means turning all said rotating means from station to station successively, and means for rendering inoperative the molding structure at any station.

8. In a molding machine, a plurality of molding stations comprising a molding material loading ring having a ring of circumferentially spaced measuring openings therethrough, one at each station, and a molding structure at each opening, means for supplying molding material to said measuring openings, means for effecting the opening and closing of said molding structures, a spout for transferring successively molding material from said measuring openings to said molding structures, means for turning said molding material supplying means, said second named means and said spout at a uniform rate from station to station, and means for arresting the movement of the discharge end of said spout with respect to a molding structure during the period molding material is being transferred from a measuring opening through the spout to such molding structure.

9. In a molding machine, a plurality of molding stations comprising a molding material loading ring having a ring of circumferentially spaced measuring openings therethrough, one at each station, and a molding structure at each opening, means for supplying molding material to said measuring openings, means for effecting the opening and closing of said molding structures, a pivoted spout for transferring molding material from said measuring openings to said molding structures, means for turning said first and second named means and said spout at a uniform rate from station to station, and a cam at each station for turning the spout on its pivot to maintain its discharge end in line with a molding structure during the period molding material is being transferred from a measuring opening through the spout to such molding structure.

10. In a molding machine, a molding compound loading ring having a ring of circumferentially spaced measuring openings therethrough, a molding structure at each opening, a continuously rotating arm, means carried by said arm for supplying molding material to said measuring openings, means rotating with said arm for effecting the opening and closing of said molding structures, and means carried by said arm for transferring successively molding material from said measuring openings to said molding structures.

11. In a molding machine, a molding material loading ring having a series of circumferentially spaced measuring openings of predetermined size to form molding compound measuring means, a molding means located at each opening comprising upper and lower molding members and actuating means for opening and closing the molding members, a sliding block having an upper wall which slides on the top surface of said ring and a lower wall which slides on the lower surface of said ring, said walls having transfer openings adapted to be moved into alignment with said measuring openings, a rotating arm to which the block is connected, a hopper carried by said arm for supplying molding material through the transfer opening in said top wall to the measuring openings, a spout carried by the lower wall for transferring molding material from the measuring openings through the transfer opening in said lower wall to the lower molding members and means rotating with said arm for effecting the opening and closing of the molding members.

12. In a molding machine, a plurality of molding stations each comprising a molding material loading ring having a series of circumferentially spaced measuring openings of predetermined size to form molding compound measuring means, and a molding means located at each opening comprising upper and lower molding members and actuating means for opening and closing the molding members, a sliding block having an upper wall which slides on the top surface of said ring and a lower wall which slides on the lower surface of said ring, said walls having transfer openings adapted to be moved into alignment with said measuring openings, a rotating arm to which the block is connected, a hopper carried by said arm for supplying molding material through the transfer opening in said top wall to the measuring openings, a pivoted spout carried by the lower wall for transferring molding material from the measuring openings through the transfer opening in said lower wall to the lower molding members, and means rotating with said arm for effecting the opening and closing of the molding members, and cam means at each station for turning the discharge end of the spout to arrest its movement for holding such end in line with the molding members during the period molding material is being transferred from a measuring opening to the molding members at a station.

13. In a molding machine, a plurality of circumferentially spaced molding stations each comprising, a molding material loading ring having a series of circumferentially spaced openings, a removable bushing in each opening of predetermined size to form a molding compound measuring means, and a molding means located at each station comprising upper and lower molding members and actuating means for opening and closing the molding members, a sliding block having an upper wall which slides on the top surface of said ring and a lower wall which slides on the lower surface of said ring, said walls having openings adapted to be moved into alignment with the openings in said bushings, a rotating arm to which the block is connected, a hopper carried by said arm for supplying molding material through the opening in said top wall to the measuring means, means carried by the lower wall for transferring molding material from the measuring means through the opening in said lower wall to the lower molding members, means rotating with said arm for effecting the opening and closing of the molding members, and means at each station for rendering inoperative the actuating means for opening and closing the molding members at such station.

14. In an automatic molding machine, a ring of circumferentially spaced molding stations each comprising a wall having an opening therethrough, a removable molding material measuring bushing in the opening, molding means positioned below said measuring bushing, and means for opening and closing the molding means, and continuously rotating means which moves past the stations for successively by gravity filling said bushings with molding material and transferring it from the bushings to the molding means.

15. In an automatic molding machine, a ring of circumferentially spaced molding stations each comprising a wall having an opening therethrough to define a molding material measuring means, molding means positioned below said opening, means for opening and closing the molding means, continuously rotating means which moves past the stations for successively by gravity filling said openings with molding material and transferring it from the openings to the molding means, compressed air operated ejector means for ejecting a molded item from a mold, and means operated by said continuously rotating means for effecting the operation of said ejector means.

16. In an automatic molding machine, a ring of circumferentially spaced molding stations each comprising a wall having an opening therethrough to define a molding material measuring means, molding means positioned below said opening, means for opening and closing the molding means, continuously rotating means which moves past the stations for successively by gravity filling said openings with molding material and transferring it from the openings to the molding means, and means actuated by said rotating means for effecting the discharge of compressed air onto the molds to clean them prior to the time molding material is transferred thereto.

CLIFFORD N. BENANDER.
GEORGE B. BENANDER.

REFERENCES CITED

The following references are of record in the file of this patent:

UNITED STATES PATENTS

| Number | Name | Date |
|---|---|---|
| 1,781,688 | Henderson | Nov. 18, 1930 |
| 1,991,706 | Seabury | Feb. 19, 1935 |
| 2,155,316 | Lauterbach | Apr. 18, 1939 |
| 2,218,456 | Soubier et al. | Oct. 15, 1940 |